United States Patent [19]

Bartholomew

[11] Patent Number: 4,669,757
[45] Date of Patent: Jun. 2, 1987

[54] HIGH PRESSURE FLUID CONDUIT ASSEMBLY

[76] Inventor: Donald D. Bartholomew, 5771 McKiney, Marine City, Mich. 48039

[21] Appl. No.: 405,698

[22] Filed: Aug. 5, 1982

[51] Int. Cl.$^4$ ............................................. F16L 9/14
[52] U.S. Cl. ..................................... 285/55; 285/138; 285/184; 285/297; 285/382; 285/906; 138/135; 138/148; 138/DIG. 8; 29/455 R
[58] Field of Search ............... 138/122, 129, 135, 144, 138/148, 150, 154, DIG. 8; 29/455 R, 521; 285/55, 138, 297, 184, 226, 223, 235, 382, 906, 114, 133 R

[56] References Cited

U.S. PATENT DOCUMENTS

| | | |
|---|---|---|
| 956,077 | 4/1910 | Greenfield . |
| 992,426 | 5/1911 | James . |
| 996,899 | 7/1911 | Witzenmann ..................... 285/114 |
| 1,409,697 | 3/1922 | Fulton . |
| 2,394,270 | 2/1946 | Swain ................................ 285/114 |
| 2,402,003 | 6/1946 | Zublin ............................... 285/114 |
| 2,759,765 | 8/1956 | Powley .......................... 285/114 X |
| 2,898,941 | 8/1959 | Kilcup . |
| 3,015,969 | 1/1962 | Bratz . |
| 3,060,069 | 10/1962 | Sindars . |
| 3,068,946 | 12/1962 | Frisby et al. .................... 285/133 R |
| 3,453,008 | 7/1969 | Lejeune ............................. 285/149 |
| 3,549,176 | 12/1970 | Contreras ........................... 285/55 |
| 3,638,973 | 2/1972 | Poletti ............................... 285/184 |
| 3,831,636 | 8/1974 | Bittner . |
| 3,847,184 | 11/1974 | God .................................. 285/223 |
| 3,929,164 | 12/1975 | Richter . |
| 3,929,165 | 12/1975 | Diebolt et al. ..................... 285/226 |
| 3,930,419 | 1/1976 | Kramer . |
| 4,111,466 | 9/1978 | Deregibus ......................... 285/138 |
| 4,172,474 | 10/1979 | Stahl . |
| 4,175,992 | 11/1979 | Grawey . |

Primary Examiner—Dave W. Arola
Attorney, Agent, or Firm—Harness, Dickey & Pierce

[57] ABSTRACT

A tubular conduit assembly for conveying a pressurized fluid is described which includes a plastic inner tube for conveying the pressurized fluid, and a flexible metal outer tube disposed coaxially around the inner tube. The outer tube is constructed from a plurality of interlocking, generally channel-shaped members. In one form of the present invention, the outer tube is comprised of two alternately facing, U-shaped metal strips which are helically wound together and slidably engaged. A predetermined radial separation is provided between the exterior diameter of the inner tube and the interior diameter of the outer tube. This predetermined separation permits a limited amount of expansion for the inner tube while resisting a blowout at normally high pressures and temperatures. While the conduit assembly is initially flexible to facilitate routing, one or more portions of the conduit assembly may be made less flexible, semi-rigid or rigid in order to retain a desired shape of the conduit assembly. According to one technique the outer tube is deformed so that the metal strips of the outer tube are no longer slidably engaged. Additionally, a flexibility reducing material may be injected into the radial separation between the inner and outer tubes, or the flexibility reducing material may be applied to the outer tube along the appropriate portion(s) of the conduit assembly. The conduit assembly may be connected between two rigid metal tubes using snap-type quick connectors to form a disparate piping system.

19 Claims, 8 Drawing Figures

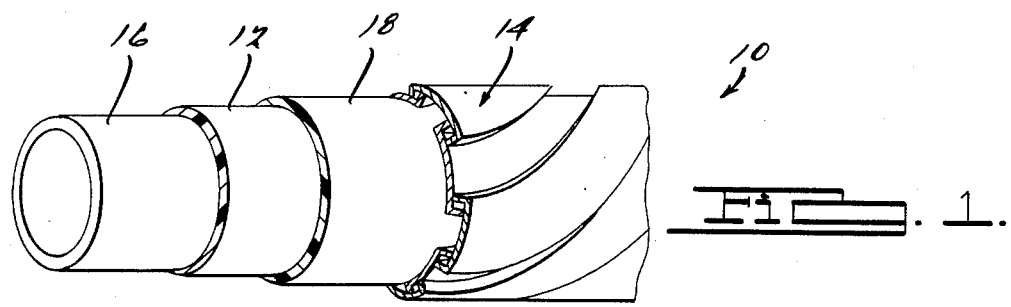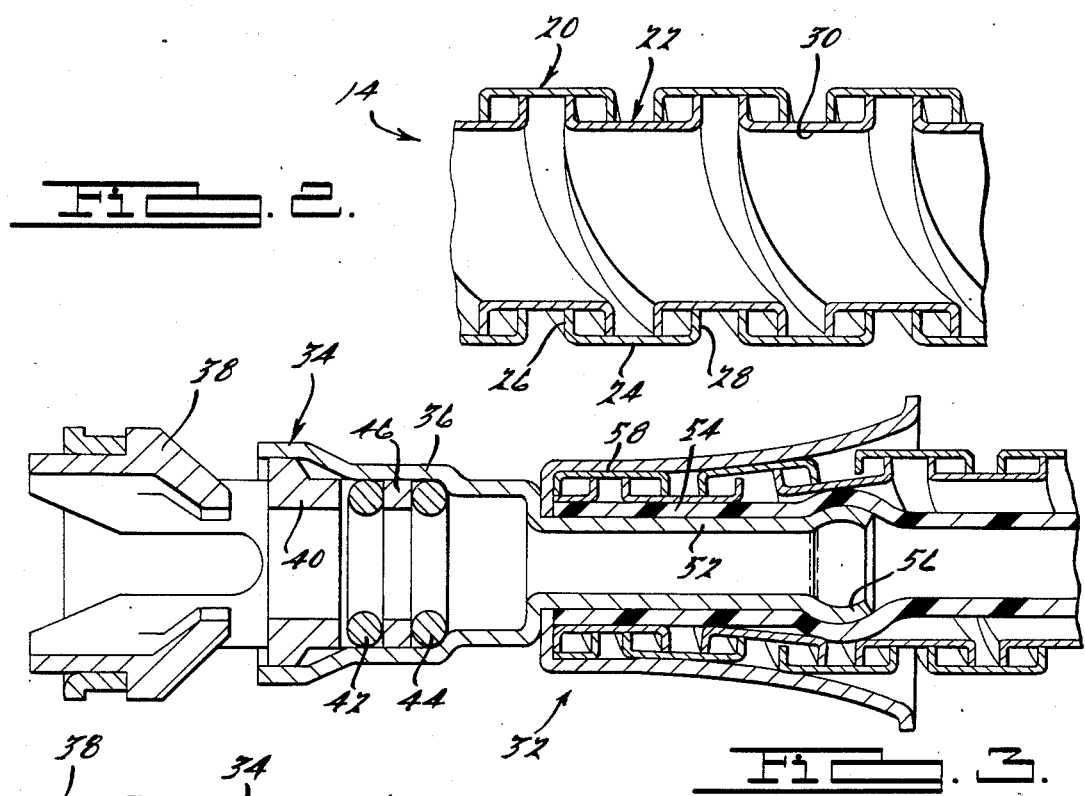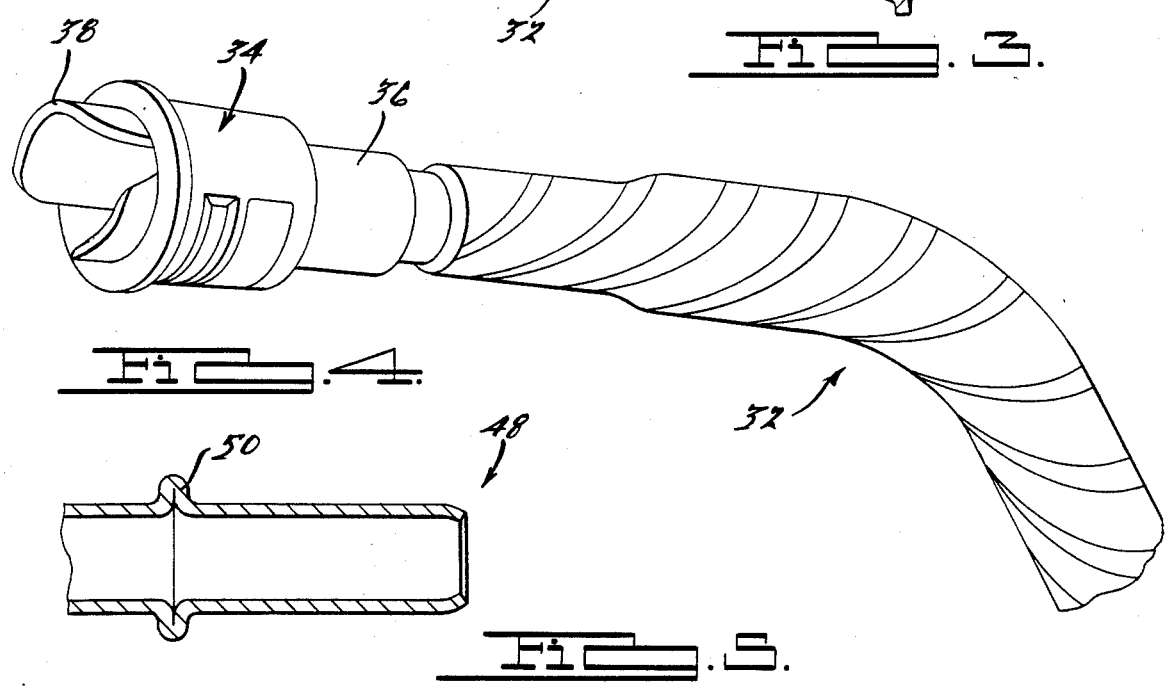

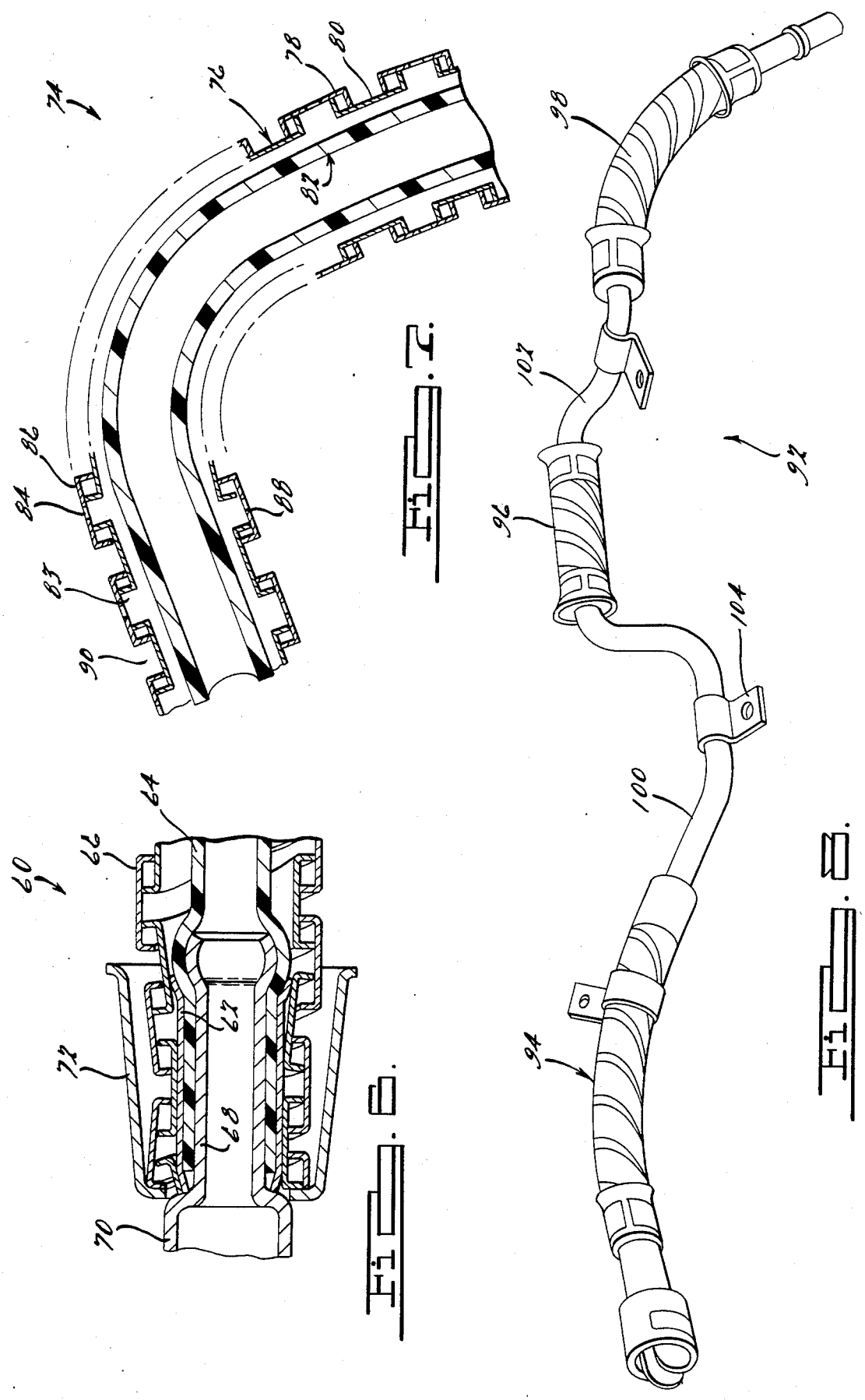

HIGH PRESSURE FLUID CONDUIT ASSEMBLY

BACKGROUND AND SUMMARY OF THE INVENTION

The present invention relates generally to conduits for conveying fluids, and particularly to a flexible conduit assembly for conveying a pressurized fluid.

In automotive and industrial applications, several fluids are typically conveyed from one part of the equipment to another, such as fuel, hydraulic and engine oil, and freon gas. In many cases, the fluid must be conveyed under somewhat severe environmental conditions, such as high pressure, wide temperature variations, dirt and vibration. Additionally, since space is usually at a premium, the pipe or conduit must generally follow a tortuous path with several bends of different angles along its length. To add further complexity, the size and weight of the conduit should be minimized, while the reliability of the conduit is maximized. Due to the formidable nature of the above-identified design constraints, a need exists to provide a conduit or piping structure which will both satisfy the above requirements and yet be economical to manufacture and install.

Accordingly, it is a principle object of the present invention to provide a routable and rugged conduit assembly for conveying a pressurized fluid, which is both economical to manufacture and install.

It is another object of the present invention to provide a conduit assembly which is adapted to employ snap-type quick connectors.

It is a further object of the present invention to provide a conduit assembly which is initially flexible, but may be made more rigid before, during or after installation.

It is an additional object of the present invention which may be used to convey a wide variety of fluids under demanding environmental conditions.

To achieve the foregoing objects, the present invention provides a novel conduit assembly for conveying a pressurized fluid wich includes a plastic inner tube for conveying the pressurized fluid, and a flexible metal outer tube disposed coaxially around the inner tube. The outer tube is constructed from one or more interlocking, generally channel-shaped member(s). In one form of the present invention, the outer tube is comprised of two alternately facing, U-shaped metal strips which are helically wound together and slidably engaged. A predetermined radial separation is provided between the exterior diameter of the inner tube and the interior diameter of the outer tube. This predetermined separation permits a limited amount of expansion for inner tube due to the pressure of the fluid and/or the temperature of the fluid (or the environment), while resisting a blowout at normally high pressures and temperatures. While the conduit assembly is initially flexible to facilitate routing, one or more portions of the conduit assembly may be made less flexible, semi-rigid or rigid in order to retain a desired shape of the conduit assembly. For example, the predetermined radial separation described above permits the outer tube to be deformed so that the metal strips of the outer tube are no longer slidably engaged, without causing any appreciable deformation of the inner tube. Additionally, a flexibility reducing material may be injected into the radial separation between the inner and outer tubes, or the flexibility reducing material may be applied to the outer tube along the appropriate portion(s) of the conduit assembly. Additionally, the conduit assembly may be connected between two rigid metal tubes using snap-type quick connectors to form a disparate piping system according to the present invention.

Additional advantages and features of the present invention will become apparent from a reading of the detailed description of the preferred embodiments which make reference to the following set of drawings in which:

BRIEF DESCRIPTION OF THE DRAWINGS

FIG. 1 is a perspective view (partially in cross-section) of a conduit assembly according to the present invention.

FIG. 2 is a fractional cross-sectional view of the outer tube for the conduit assembly shown in FIG. 1.

FIG. 3 is a cross-sectional view of a conduit assembly according to the present invention, particularly illustrating the attachment of a connector member to the conduit assembly.

FIG. 4 is a perspective view of the conduit assembly shown in FIG. 3.

FIG. 5 is a cross-sectional view of a male connector member adapted to be joined to the connector member shown in FIGS. 3 and 4 in a snap-type connection.

FIG. 6 is a fractional cross-sectional view of another connector assembly, particularly illustrating a reinforcing sleeve element interposed between the inner tube and the outer tube of the conduit assembly.

FIG. 7 is a fractional cross-sectional view of another conduit assembly, particularly illustrating the techniques for reducing the flexibility of a portion of the conduit assembly.

FIG. 8 is a perspective view of a disparate piping system according to the present invention.

DETAILED DESCRIPTION OF THE PREFERRED EMBODIMENTS

Referring to FIG. 1, a perspective view (partially in cross-section) of a conduit assembly 10 according to the present invention is shown. The conduit assembly 10 generally comprises a plastic inner tube 12 for conveying a pressurized fluid, and a flexible metal outer tube 14 disposed coaxially around the inner tube. A predetermined radial separation is provided between the exterior diameter of the inner tube 12 and the interior diameter of the outer tube 14. Additionally, the conduit assembly 10 may include one or more layers of a protective barrier material, such as interior and exterior layers 16 and 18, which may be coated or otherwise coaxially disposed interiorly and exteriorly of the inner tube 12. The inner tube 12 may be constructed from any suitable plastic or thermoplastic which is chemically resistant or inert to the fluid and any other chemical entities with which it will come into contact.

One advantage of the present invention is that a relatively low strength flexible plastic may be employed for the inner tube 12, such as type 6 nylon because the outer tube 14 operates to limit the expansion of the inner tube 12. Thus, while the radial separation between the inner and outer tubes permits a limited amount of expansion, the interior diameter of outer tube 14 defines an outer limit for the inner tube 12 which will resist a blowout at abnormally high pressures and temperatures. Accordingly, the outer tube 14 enables the conduit assembly to operate at pressures and/or temperatures beyond the capability of the inner tuber 12 alone. However, it should be noted that the radial separation between the inner and outer tubes should also be sufficiently small to prevent the inner tube 12 from kinking or becoming "out of round" when the conduit assembly is bent. In one preferred construction of the present invention, the I.D. of the outer tube 14 is no greater than 2 m.m. or 15% greater than the O.D. of the inner tube 12.

If the plastic material selected for the inner tube 12 is sensitive to one or more chemical entities, such as a salt used for deicing in the presence of water, one or both of the protective layers 16 and 18 may be provided as a thin barrier which will be unaffected by the chemical and/or environmental conditions encountered by the conduit assembly 10. Indeed, the layer 18 may be provided simply to protect the layer 16. Suitable barrier materials are exemplified by type 11 nylon, type 12 nylon, and sarans.

Referring to FIG. 2, a fractional cross-sectional view of the outer tube 14 is shown. The outer tube 14 is constructed from stainless steel or other suitable materials, metallic or otherwise, and is shown to be comprised of two alternatively facing, U-shaped metal strips 20 and 22 which are helically wound together and slidably engaged. Each of the metal strips 20 and 22 include a generally flat central sheet portion 24 and two opposing flange portions 26 and 28 extending therefrom at a generally 90 degree angle. This construction provides for a smooth, non-snagging sectional interior surface 30 for the outer tube 14 which is adapted to contact and control the shape of the inner tube 12. It should be understood that the flanges for each of the metal strips 20 and 22 serve to interlock the 2 strips together, and that the flange portions for each of the metal strips are slidably engaged to the central sheet portion of the opposite metal strip so that the outer tube 14 is flexible and may be readily bent. It should also be understood that the particular construction for the outer tube 14 described above is intended to be exemplary only, and that any flexible metal tube constructed from a single or plurality of interlocking, generally channel-shaped members may be employed.

Referring to FIG. 3, a cross-sectional view of a conduit assembly 32 according to the present invention is shown. The conduit assembly 32 particularly features a snap-type quick connector 34 for providing a fluid-tight connection to other conduit assemblies, pipes and the like. The connector 34 generally comprises a housing 36, retainer element 38, a bushing 40, elastomeric sealing elements 42 and 44 and an annular spacing element 46. A perspective view of the conduit assembly 32 with the connector 34 attached thereto is shown in FIG. 4. FIG. 5 illustrates a cross-sectional view of a male connector member 48 which is adapted to be joined to the connector 34 by inserting the connector member 48 into the bore of the housing 36 until an annular protrustion 50 formed in the connector member 48 snaps past the inwardly extending fingers of the retainer element 38. The elastomeric sealing elements 42 and 44 are adapted to provide a fluid tight seal between the housing 36 and the connector member 48. A more detailed description of suitable snap tight quick connectors may be found in my prior patent application Ser. No. 360,201, entitled "A Swivelable Quick Connector Assembly," filed on Mar. 22, 1982, which is hereby incorporated by reference.

The housing 36 of the connector 34 also includes an elongated tubular portion 52 which is inserted into the inner tube 54 of the conduit assembly 32. The tubular portion 52 includes an annular enlargement 56 at the end of the housing 36. In accordance with the present invention, the outer tube 58 of the conduit assembly 32 is deformed along the tubular portion 52 of the connector housing 36 between the end of the outer tube 58 and the enlargement 56 such that the interior diameter of the outer tube is reduced. The deformation of the outer tube 14 may be accomplished by any suitable means, such as crimping, swaging, clamping, rolling, staking and the like. Accordingly, the enlargement 56 operates in combination with the reduced diameter portion of the outer tube 58 to resist or prevent the connector housing 36 from being pulled out or separated from the conduit assembly 32.

Referring to FIG. 6, a fractional cross-sectional view of another connector assembly 60 is shown. FIG. 6 particularly illustrates a reinforcing sleeve element 62 which is interposed between the inner tube 64 and the outer tube 66 of the conduit assembly 60 along the tubular portion 68 of the connector housing 70. The reinforcing sleeve element 62 is comprised of a plastic or metal generally funnel shaped sleeve having a split along its entire length so that the sleeve may contract against the inner tube 64 when the end of the outer tube 66 is crimped or otherwise inwardly deformed. The reinforcing sleeve element 62 serves the purpose of providing a smooth reinforcement of the inner tube 64 which enhances the seal between the inner tube and the tubular portion 68 of the connector housing 70. FIG. 6 also illustrates an exterior ferrule which may be employed to cover any sharp corners at the end of the outer tube 66. The ferrule 72 may also be configured to assist the retention of the connector housing 70 within the conduit assembly 60 in the appropriate application.

Referring to FIG. 7, a fractional cross-sectional view of another conduit assembly 74 is shown. While it is desirable to have a conduit assembly which is initially flexible, in many instances it is also desirable to reduce the flexibility of the conduit assembly once a desired shape has been found. The conduit assembly 74 of FIG. 7 serves to illustrate three techniques which may be employed individually or in combination to reduce the flexibility of a portion of the conduit assembly and retain a desired shape for that portion of the conduit assembly. Firstly, the outer tube 76 of the conduit assembly may be deformed by crimping, staking, clamping, and the like such that the metal strips 78 and 80 of the outer tube are no longer slidably engaged. This inward deformation of the outer tube 76 is permitted by the radial separation between the exterior diameter of the inner tube 82 and the interior diameter or the outer tube 76.

The flexibility of the conduit assembly 74 may also be reduced by injecting a flexibility reducing material 83 into the radial separation between the exterior diameter of the inner tube 82 and the interior diameter of the outer tube 76. This flexibility reducing material may be injected at one or more apertures 84 formed in the central sheet portion 86 of the metal strip 88 for the outer tube 76. This material may have the consistency of a liquid, paste, or gell when injected so as to substantially fill the radial separation between the inner and outer tubes. However, after the flexibility reducing material 83 has been injected into the conduit assembly 74 the material hardens, cures, or otherwise resists further flow, thereby resisting or preventing relative movement between the two metal strips of the outer tube 76. The flexibility reducing material 83 may be constructed from any suitable material which will rapidly harden or resist further flow after injection, and also be resistant or inert to the chemical entities and with which it will come into contact. The flexibility reducing material must also be capable of withstanding significant variations in the temperature of the environment. Suitable flexibility reducing materials are exemplified by epoxys and waterglass. A third and related technique for reducing the flexibility of the conduit assembly 74 is to mold, coat, or otherwise apply the flexibility reducing material to the outer tube 76 such that the material fills the channel-shaped voids 90 between adjoining sections of the metal strips of the outer tube. It should be appreciated that one or more of the above techniques may be employed to transform one or more portions of the conduit assembly 74 from being flexible in character to being semi-rigid or rigid in character.

Referring to FIG. 8, a perspective view of a disparate piping system 92 according to the present invention is shown. The piping system 92 includes three conduit assemblies 94–98 connected between two rigid metal tubes 100 and 102. One or more clamps, such as clamp 104, may be provided to fixedly secure the piping system 92 at various places along its length. The piping system 92 is particularly advantageous when installation requires that one or more preformed or preshaped rigid metal tubes be employed. It should be appreciated that the connection of a conduit assembly between two rigid metal pipes, such as a conduit assembly 96 and the metal pipes 100 and 102, eliminates the need for maintaining strict tolerances for the distance between the rigid metal tubes. Another benefit of the piping system 92 is that the use of the connector assemblies 94–98 permit the piping system to be conveniently tested prior to installation, thereby minimizing the possibility of improper connections and the need to make repairs on site.

The various embodiments which have been set forth above were for the purpose of illustration and were not intended to limit the invention. It will be appreciated by those skilled in the art that various changes and modifications may be made to these embodiments described in this specification without departing from the spirit and scope of the invention as defined by the appended claims.

What is claimed is:

1. A tubular conduit assembly for conveying a pressurized fluid, comprising:
   a plastic inner tube for conveying said pressurized fluid; and
   a flexible metal outer tube disposed coaxially around and containing said inner tube, said outer tube is comprised of at least two alternately facing, U-shaped metal strips which are helically wound together and slidably engaged, at least one portion of said outer tube is deformed for decreasing the flexibility of said outer tube and retaining the shape of said portion of said conduit assembly, there being a predetermined radial separation between the exterior diameter of said inner tube and the interior diameter of said outer tube.

2. The tubular conduit assembly according to claim 1, wherein said predetermined separation limits the expansion of said inner tube, and permits said outer tube to be deformed without any appreciable deformation of said inner tube.

3. The tubular conduit assembly according to claim 1, wherein said inner tube is coated with a protective barrier material.

4. The tubular conduit assembly according to claim 1, wherein said conduit assembly includes at least one connector member secured thereto, said connector member having an elongated tubular portion inserted into said inner tube at one end of conduit assembly, said tubular portion including an enlargement at the end of said connector member, said outer tube of said conduit assembly being deformed along said tubular portion of said connector member between the end of said outer tube and said enlargement such that the interior diameter of said outer tube is reduced.

5. The invention as set forth in claim 1 wherein the I.D. of the outer tube is no greater than 2 m.m. or 15% greater than the O.D. of the inner tube.

6. A tubular conduit assembly for conveying a pressurized fluid, comprising:
   plastic inner tube for conveying said pressurized fluid;
   a flexible metal outer tube disposed coaxially around said inner tube, said outer tube comprised of at least two alternating facing, U-shaped metal strips which are helically wound together and slidably engaged, a predetermined radial separation between the exterior diameter of said inner tube and the interior diameter of said outer tube, and at least one portion of said outer tube is deformed by crimping for decreasing the flexibility of said outer tube and retaining the shape of said portion of said conduit assembly.

7. A tubular conduit assembly for conveying a pressurized fluid, comprising:
   a plastic inner tube for conveying said pressurized fluid;
   a flexible metal outer tube disposed coaxially around said inner tube, said outer tube being constructed from at least one interlocking, generally channel-shaped member;
   a predetermined radial separation between the exterior diameter of said inner tube and the interior diameter of said outer tube,
   at least one connector member secured to said conduit assembly, said connector member having an elongated tubular portion inserted into said inner tube at one end of said conduit assembly, said tubular portion including an enlargement at the end of said connector member, said outer tube of said conduit assembly being deformed along said tubular portion of said connector member between the end of said outer tube and said enlargement such that the interior diameter of said outer tube is reduced, and
   a reinforcing sleeve element is interposed between said inner tube and said outer tube along said tubular portion of said connector member.

8. A tubular conduit assembly for conveying a pressurized fluid, comprising:
   a plastic inner tube for conveying said pressurized fluid;
   a flexible metal outer tube disposed coaxially around said inner tube, said outer tube being constructed from at least one interlocking, generally channel-shaped member;
   a predetermined radial separation between the exterior diameter of said inner tube and the interior diameter of said outer tube, and
   a flexibility reducing material is injected into said separation between the exterior diameter of said inner tube and the interior diameter of said outer tube along at least one portion of said conduit assembly.

9. A tubular conduit assembly for conveying a pressurized fluid, comprising:
a plastic inner tube for conveying said pressurized fluid;
a flexible metal outer tube disposed coaxially around said inner tube, said outer tube being constructed from at least one interlocking, generally channel-shaped member;
a predetermined radial separation between the exterior diameter of said inner tube and the interior diameter of said outer tube, and
a flexibility reducing material is applied to said outer tube along at least one portion of said conduit assembly.

10. A disparate piping system for conveying a pressurized fluid, comprising:
at least two rigid metal tubes each having a predetermined shape; and
at least one conduit assembly connected between said rigid metal tubes, said conduit assembly including a plastic inner tube for conveying said pressurized fluid, and a flexible metal outer tube disposed coaxially around and containing said inner tube, said outer tube being comprised of two alternately facing metal strips which are helically wound together and slidably engaged, at least one portion of said outer tube is deformed for decreasing the flexibility of said outer tube and retaining the shape of said portion of said conduit assembly, and a predetermined radial separation between the exterior diameter of said inner tube and the interior diameter of said outer tube.

11. The disparate piping system according to claim 10, wherein said predetermined separation limits the expansion of said inner tube, and permits said outer tube to be deformed without any appreciable deformation of said inner tube.

12. The disparate piping system according to claim 10, wherein said inner tube is coated with a protective barrier material.

13. The disparate piping system according to claim 10, wherein said conduit assembly includes a connector member secured at each end thereof, each of said connector members having an elongated tubular portion inserted into said inner tube at one end of conduit assembly, said tubular portion including an enlargement at the end of said connector member, said outer tube of said conduit assembly being deformed along said tubular portion of said connector member between the end of said outer tube and said enlargement such that the interior diameter of said outer tube is reduced.

14. A disparte piping system for conveying a pressurized fluid, comprising:
at least two rigid metal tubes each having a predetermined shape, at least one conduit assembly connected between said rigid metal tubes, said conduit assembly including a plastic inner tube for conveying said pressurized fluid, and a flexible metal outer tube disposed coaxially around said inner tube, said outer tube is comprised of two alternating facing, U-shaped metal strips which are helically wound together and slidably engaged, a predetermined radial separation between the exterior diameter of said inner tube and the interior diameter of said outer tube, at least one portion of said outer tube is deformed by crimping for decreasing the flexibility of said outer tube and retaining the shape of said portion of said conduit assembly.

15. A disparte piping system for conveying pressurized fluid, comprising:
at least two rigid metal tubes each having a predetermined shape;
at least one conduit assembly connected between said rigid metal tubes, said conduit assembly including a plastic inner tube for conveying said pressurized fluid and a flexible metal outer tube disposed coaxially around said inner tube, said outer tube being constructed from a plurality of interlocking, generally channel-shaped members, a predetermined rate of separation between the exterior diameter of said inner tube and the interior diameter of said outer tube, a connector member secured at each end of said conduit assembly, each of said connector members having an elongated tubular portion inserted into said inner tube at one end of said conduit assembly, said tubular portion including an enlargement at the end of said connector member, said outer tube of said conduit assembly being deformed along said tubular portion of said connector member between the end of said outer tube and said enlargement such that the interior diameter of said outer tube is reduced, and
a reinforcing sleeve element is interposed between said inner tube and said outer tube along said tubular portion of said connector member.

16. A disparte piping system for conveying a pressurized fluid, comprising:
at least two rigid metal tubes each having a predetermined shape;
at least one conduit assembly connected between said rigid metal tubes, said conduit assembly including a plastic inner tube for conveying said pressurized fluid, and a flexible metal outer tube disposed coaxially around said inner tube, said outer tube comprised of two alternating facing, U-shaped metal strips which are helically wound together and slidably engaged, a predetermined radial separation between the exterior diameter of said inner tube and the interior diameter of said outer tube, and a flexibility reducing material is injected into said separation between the exterior diameter of said inner tube and the interior diameter of said outer tube along at least one portion of said conduit assembly.

17. A disparte piping system for conveying a pressurized fluid, comprising:
at least two rigid metal tubes each having a predetermined shape;
at least one conduit assembly connected between said rigid metal tubes, said conduit assembly including a plastic inner tube for conveying said pressurized fluid, and a flexible metal outer tube disposed coaxially around said inner tube, said outer tube being comprised of two alternating facing, U-shaped metal strips which are helically wound together and slidably engaged, a predetermined radial separation between the exterior diameter of said inner tube and the interior diameter of said outer tube, and a flexibility reducing material is applied to said outer tube along at least one portion of said conduit assembly.

18. A method of utilizing a tubular conduit assembly comprising a plastic inner tube carried within a flexible metal outer tube and having relatively flexible and relatively non-flexible sections, the steps which comprise:
    initially providing a length of said conduit assembly in a completely flexible condition;
    selecting predetermined sections of said assembly which are to be relatively non-flexible; and
    operating on said outer tube at said predetermined sections to cause said sections to become relatively non-flexible.

19. The method as set forth in claim 18 wherein said operation comprises mechanically deforming said outer tube.

* * * * *

UNITED STATES PATENT AND TRADEMARK OFFICE
CERTIFICATE OF CORRECTION

PATENT NO. : 4,669,757　　　　　　　　　　Page 1 of 2

DATED :

June 2, 1987

INVENTOR(S) :　Donald D. Bartholomew

It is certified that error appears in the above-identified patent and that said Letters Patent is hereby corrected as shown below:

Col. 1, Line 41,　　　　　　　　　　"wich" should be --which--

Col. 4, Line 23,　　　　　　　　　　"contract" should be ----contact--

Col. 4, Line 61,　　　　　　　　　　"gell" should be --gel--

Col. 5, Lines 57-58, Claim 1, delete "there being" and insert --and--

Col. 7, Lines 26-27, Claim 10,

Reference to Claim 13, after "facing" insert --, U-shaped--

Col. 7, Line 54, Claim 14,

"disparte" should be --disparate--

Col. 8, Line 31, Claim 16,

"disparte" should be --disparate--

UNITED STATES PATENT AND TRADEMARK OFFICE
CERTIFICATE OF CORRECTION

PATENT NO. : 4,669,757

DATED : June 2, 1987

INVENTOR(S) : Donald D. Bartholomew

It is certified that error appears in the above-identified patent and that said Letters Patent is hereby corrected as shown below:

Col. 8, Line 50, Claim 17,   "disparte" should be —disparate—

Col. 8, Line 3, Claim 15,   "disparte" should be —disparate—

Signed and Sealed this

Eighth Day of March, 1988

Attest:

DONALD J. QUIGG

*Attesting Officer*   *Commissioner of Patents and Trademarks*